(12) United States Patent
Michaelis

(10) Patent No.: US 7,379,431 B2
(45) Date of Patent: May 27, 2008

(54) ERROR CORRECTION METHOD AND APPARATUS FOR TTY ON VOIP TRANSMISSIONS

(75) Inventor: Paul R. Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1597 days.

(21) Appl. No.: 10/192,978

(22) Filed: Jul. 10, 2002

(65) Prior Publication Data
US 2004/0008667 A1 Jan. 15, 2004

(51) Int. Cl.
H04B 3/20 (2006.01)
H04L 12/66 (2006.01)
H04J 1/02 (2006.01)
H04M 11/00 (2006.01)
H04M 1/64 (2006.01)

(52) U.S. Cl. ............... 370/286; 370/356; 370/493; 379/52; 379/88.17; 379/93.18

(58) Field of Classification Search ............... None
See application file for complete search history.

(56) References Cited

U.S. PATENT DOCUMENTS

| | | | |
|---|---|---|---|
| 6,421,425 B1 * | 7/2002 | Bossi et al. ............ | 379/52 |
| 6,504,910 B1 * | 1/2003 | Engelke et al. ......... | 379/52 |
| 6,603,835 B2 * | 8/2003 | Engelke et al. ......... | 379/52 |
| 6,611,804 B1 | 8/2003 | Dorbecker et al. | |
| 6,625,259 B1 * | 9/2003 | Hollatz et al. ......... | 379/88.17 |
| 6,842,503 B1 | 1/2005 | Wildfeuer | |
| 6,961,320 B1 * | 11/2005 | Swaminathan et al. .... | 370/298 |
| 7,027,986 B2 * | 4/2006 | Caldwell et al. ........ | 704/235 |

OTHER PUBLICATIONS

"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.

(Continued)

Primary Examiner—Melanie Jagannathan
(74) Attorney, Agent, or Firm—Sheridan Ross P.C.

(57) ABSTRACT

The present invention is directed to a system for reliably transmitting characters encoded as audible signals using voice over Internet protocol communication systems. According to an embodiment of the present invention, tones within a sequence of tones encoding a textual character are transmitted using two data packets. The first data packet includes a segment of time having a starting boundary that is synchronized with the start of the encoded tone and extending for a time period equal to about one-half the total time period of the tone. The second packet encodes the remaining half of the audible tone. At the receiving end, data packets encoding a textual character are ordered according to the position occupied by the data encoded by the packet within the sequence of tones. If any unpaired packets of data are detected at the receiving end, the characteristics of the packets that are unpaired are copied into the time slot that would have been occupied by the missing packet. Accordingly, the present invention allows for the accurate transmission of textual characters over VoIP networks, even where a packet of data encoding part of a sequence of packets encoding a character is dropped.

32 Claims, 4 Drawing Sheets

OTHER PUBLICATIONS

H. Schulzrinne et al., "RFC 2833—RTP Payload for DTMF Digits, Telephony Tones and Telephony Signals," Network Working Group Request for Comments 2833 (May 2000), available at http://www.faqs.com/rfcs/rfc2833.html, 23 pages.

G. Hellstrom et al., "RFC 2793—RTP Payload for Text Conversation," Network Working Group Request for Comments 2793 (May 2000), available at http://www.faqs.org/rfcs/rfc2793.html, 8 pages.

* cited by examiner

ERROR CORRECTION METHOD AND APPARATUS FOR TTY ON VOIP TRANSMISSIONS

FIELD OF THE INVENTION

The present invention relates to TTY transmissions. In particular, the present invention relates to the reliable provision of TTY information transmitted using voice over Internet protocol communication networks.

BACKGROUND OF THE INVENTION

In order to allow for people having speech and/or hearing disabilities that prevent them from using conventional telephones to communicate over the public switched telephony network, text telephones (TTY devices), also known as telecommunications devices for the deaf (TDD devices) have been developed. In general, such devices encode characters of text using sequences of audible tones. In particular, in response to receiving a command to transmit a character, a TTY device will generate a sequence of audible tones that is transmitted through the telephone network to a similar TTY device at the receiving end. The TTY device at the receiving end decodes the sequence of audible tones, and displays or otherwise outputs the encoded character.

In the United States, TTY devices communicate with one another using a 45.45 baud frequency shift key protocol commonly referred to as Baudot signaling. Baudot signaling transmits characters using a sequence of seven audible tones at either 1400 Hz or 1800 Hz. In particular, a Baudot character comprises a start bit of 1800 Hz, five tones of either 1400 or 1800 Hz to signal the series of five bits specifying the character, and a stop bit of 1400 Hz. There is no error correction. At 45.45 baud, the duration of each individual tone is 22 ms. By coincidence, the duration of individual tones used in Baudot signaling is very close to the time segment of a voice communication that is included in a packet of data transmitted in connection with a typical voice over IP (VoIP) communication system.

VoIP systems are increasingly popular as a way to efficiently allow parties to engage in voice communications. In particular VoIP systems allow parties to communicate by voice over computer networks, such as the Internet, rather than requiring the establishment of a dedicated, point-to-point communication link, as in traditional switched circuit telephony. Accordingly, VoIP can be a very economical way to conduct voice communications.

Unfortunately, existing VoIP systems are problematic when used in conjunction with TTY devices. The problem is caused by packet loss. Specifically, VoIP systems transmit digital audio streams, such as voice, by breaking the streams into individual packets (typically 20 ms in length, although packet sizes of other lengths are not precluded). Each of these packets is assigned header information, such as the digital audio encoding scheme that was used, a sequence number, and a destination. It is important to note that the route to the destination is not part of the header information.

The ability for each packet to take what is, at that instant, the "best" route to the destination is where VoIP derives its economic advantage. It is also the reason why TTY-on-VoIP is unreliable: because packets are free to take different pathways, they cannot be relied upon to arrive at the receiving device before it is their "turn" to be played. Although these packets often arrive eventually, they are regarded as lost because they did not arrive in time, and must therefore be discarded.

Under most circumstances, the loss of occasional packets is not detectable in voice communication. The reasons is that VoIP telephones employ packet loss concealment algorithms that trick the human ear by mimicking the acoustic properties of adjacent packets. Although these techniques work well with voice, they do not work with TTY characters. If a packet containing a TTY tone is lost, the VoIP packet loss concealment techniques of the present art are unable to recover it or rebuild it.

Systems for improving the reliability of TTY transmissions have been developed in other domains, for example in connection with digital wireless telephony applications. (In wireless telephony, the problem being addressed was not due to packet loss, but was instead caused by the use of voice-optimized audio encoding techniques that cannot encode TTY tones without distortion). All of these approaches rely on a modem-type mechanism, which the TTY's Baudot tones are not transmitted as an audio stream, but are instead translated into a non-audio data stream. Despite their inherent reliability, these approaches are not entirely satisfactory because they tend to preclude mixed-mode voice and TTY dialog. This is a significant problem because nearly half of all TTY users are hard of hearing, but still speak clearly. These individuals prefer to receive with their TTYs and then speak in response, something they are unable to do on systems that do not permit TTY and voice transmissions to be intermixed.

SUMMARY OF THE INVENTION

The present invention is directed to solving these and other problems and disadvantages of the prior art. Generally, according to the present invention, each acoustic tone within a sequence of acoustic tones comprising a Baudot character is transmitted as a pair of data packets. At the receiving end, the data packets are placed back into the order in which they were transmitted. If any of the received data packets are unpaired, the missing information is recovered by copying the characteristics of the unpaired packet into the empty time slot. Accordingly, redundancy is provided, lessening the chance that a character will be lost.

In order to implement the present invention, the first packet within a pair of packets is synchronized to the start of the tone that it encodes. The first packet comprises about one-half of the length of time occupied by the tone. The remaining portion of the tone is encoded in the second packet.

In accordance with another embodiment of the present invention, a system for reliably transmitting Baudot characters over a VoIP communication network is provided. According to the invention, a packetizer is synchronized so that a first packet of data comprising a first portion of a tone included in a sequence of audible tones encoding a Baudot character includes an initial packet border that is synchronized to the start of the tone. The remainder of the tone is included in a second data packet. At the receiving end, the packets encoding a Baudot character are placed in the appropriate time slot, and analyzed to determine whether any packets are unpaired. The receiving device rebuilds any packets that are dropped during transmission by copying the characteristics of any unpaired packets into the unoccupied time slot. The encoded sequence of tones is then provided to the TTY device at the receiving end, and the signaled character is output.

The present invention allows for Baudot characters to be transmitted across VoIP networks reliably. In addition, the present invention allows for the reliable transmission of Baudot characters over VoIP networks, while simultaneously allowing conventional voice communications to be transmitted.

DETAILED DESCRIPTION

Figure 1:
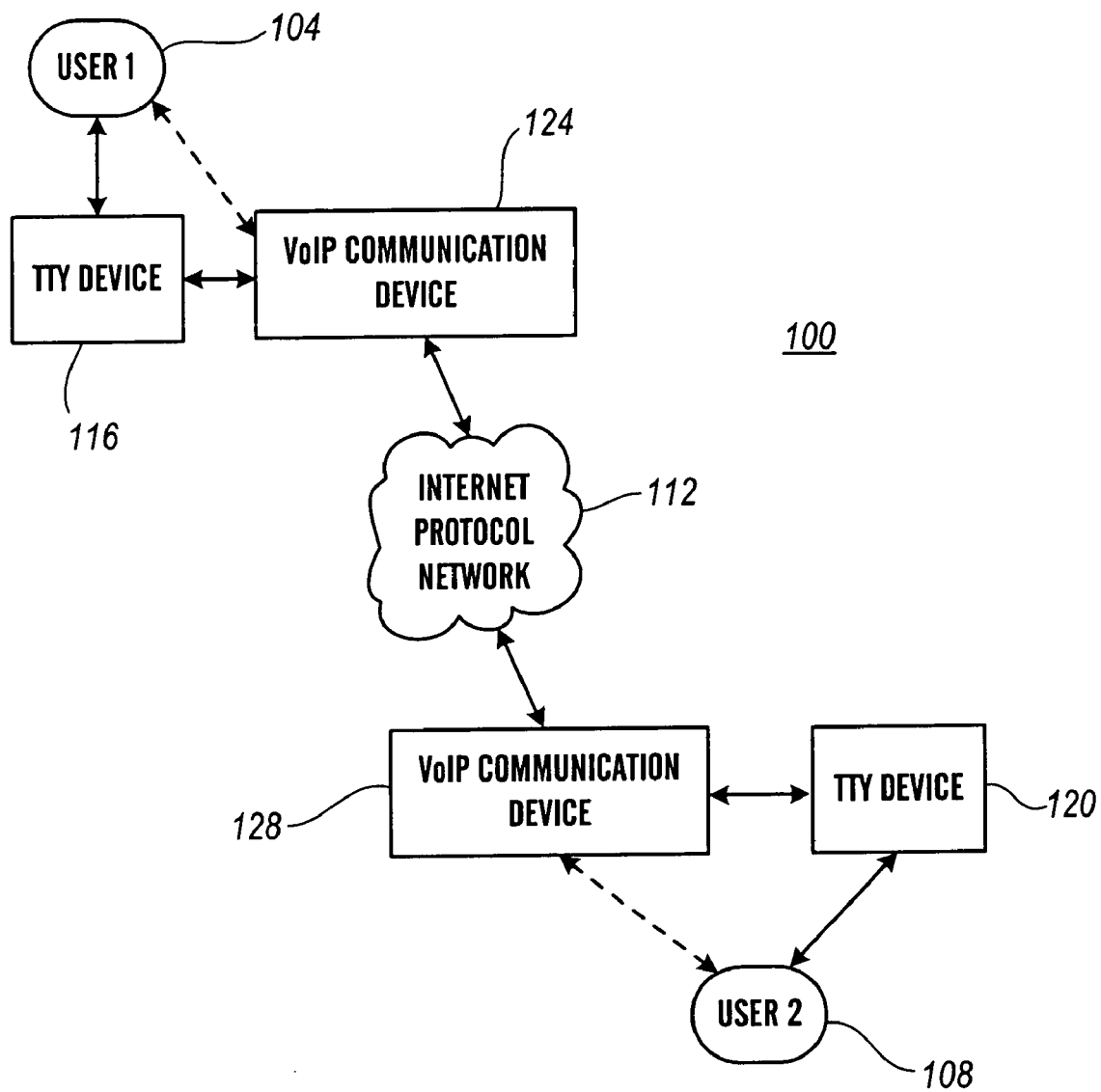
FIG. 1 is a block diagram depicting a system including a voice over Internet protocol network interconnected to TTY devices in accordance with an embodiment of the present invention.

In FIG. 1, a system 100 allowing communications between a first user 104 and a second user 108 over an Internet protocol network 112 in connection with a first teletype (TTY) or telecommunication device for the deaf (TDD) device 116 and a second TTY or TDD device 120 is depicted. In general, the first TTY device 116 is interconnected to the Internet protocol network 112 through a first voice over Internet protocol (VoIP) communication device 124. Similarly, the second TTY device 120 is interconnected to the Internet protocol network 112 through a second VoIP communication device 128.

In a typical arrangement, a TTY device 116, 120 is coupled to a communication device, including a VoIP communication device 124, 128, by an acoustical or an electronic coupler. In an acoustical coupler arrangement, the TTY device 116 provides a mechanical coupler that receives the speaker portion of a handset associated with the communication device 124, 128 at a receiver portion of the coupler, and receives the microphone portion of the handset associated with the communication device 124, 128 at an output portion of the coupler. Such couplers often include flexible bellows arrangements, to improve the efficiency with which audible signals are transferred between the handset and the TTY device 116, 120. In such arrangements, signals encoding characters are transmitted or received as audible analog data. In an electronic coupler arrangement, the TTY device 116, 120 passes analog or digital electronic representations of the audible tones comprising a textual character to the communication device 124, 128. Furthermore, in a typical arrangement, the VoIP communication device 124, 128 performs the necessary encoding and packetizing of the audible information for transmission across the Internet protocol network 112. Similarly, the VoIP communication device 124, 128 at the receiving end typically unpacketizes and decodes the audible data.

Figure 2:
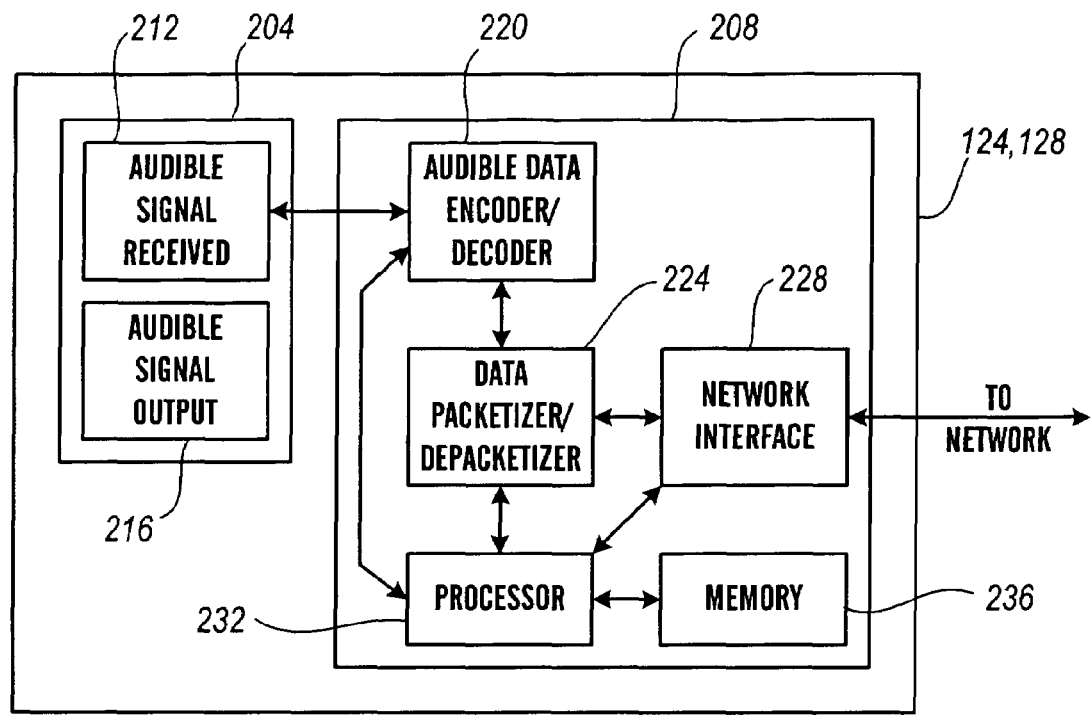
FIG. 2 is a block diagram depicting a VoIP communication device in accordance with an embodiment of the present invention.

With reference now to FIG. 2, a block diagram depicting a VoIP communication device 124, 128 in accordance with an embodiment of the present invention is illustrated. In general, the VoIP communication device 124, 128 comprises a handset or headset portion 204 and a base portion 208. The handset portion 204 generally includes an audible signal receiver 212 and an audible signal output 216. As can be appreciated, instead of or in addition to being included as part of a telephone handset 204, an audible signal receiver 212 and an audible signal output 216 may be provided as part of the base (e.g., base 208) for example when a VoIP communication device 124, 128 provides and is used as a speaker phone.

The base 208 generally includes the hardware and software, microcode, and/or firmware required to convert audible signal information between analog electronic signals received by the audible signal receiver 212 and provided by the audible signal output 216, and packet data transmitted across the Internet protocol network 112. Accordingly, the base unit 208 may include an audible data encoder/decoder 220 for digitizing an analog electronic representation of an audible signal received by the audible signal receiver 212. In addition, the audible data encoder/decoder 220 may create an analog electronic output for provision to the audible signal output 216 in response to the receipt of a digital representation of such data. The base 208 of the VoIP communication device 124, 128 additionally includes a data packetizer/depacketizer 224. The data packetizer/depacketizer creates packets of digitized audible data received from the audible data encoder/decoder 220. In particular, packets containing data encoding segments of an audible signal are created. In addition, the data packetizer/depacketizer 224 receives packets containing digital representations of audible signals, and provides that digital data to the audible data encoder/decoder 220.

The network interface 228 serves to interconnect the VoIP communication device 124, 128 to the Internet protocol network 112. Accordingly, the network interface 228 comprises the physical link between the VoIP communication device 124, 128 and the Internet protocol network 112.

The VoIP communication device 124, 128 initially may include a processor 232 and memory 236. In general, the processor 232 may control the functions of the other components of the VoIP communication device 124, 128, such as the audible data encoder/decoder 220, the data packetizer/depacketizer 224 and the network interface 228. In addition, the processor 232 may store data or run application programs stored on the memory 236. In a further aspect, the processor 232 may implement the functions of, for example, the audible data encoder/decoder 220 and/or the data packetizer/depacketizer 224. Accordingly, the processor 232 may comprise, for example, a general purpose programmable processor, ASIC, or DSP. The memory 236 may comprise any computer data storage device, such as solid state memory, a hard disk drive, or read only memory. As can be appreciated, the processor 232 and memory 236 may also be implemented as a single controller type device.

Figure 3:
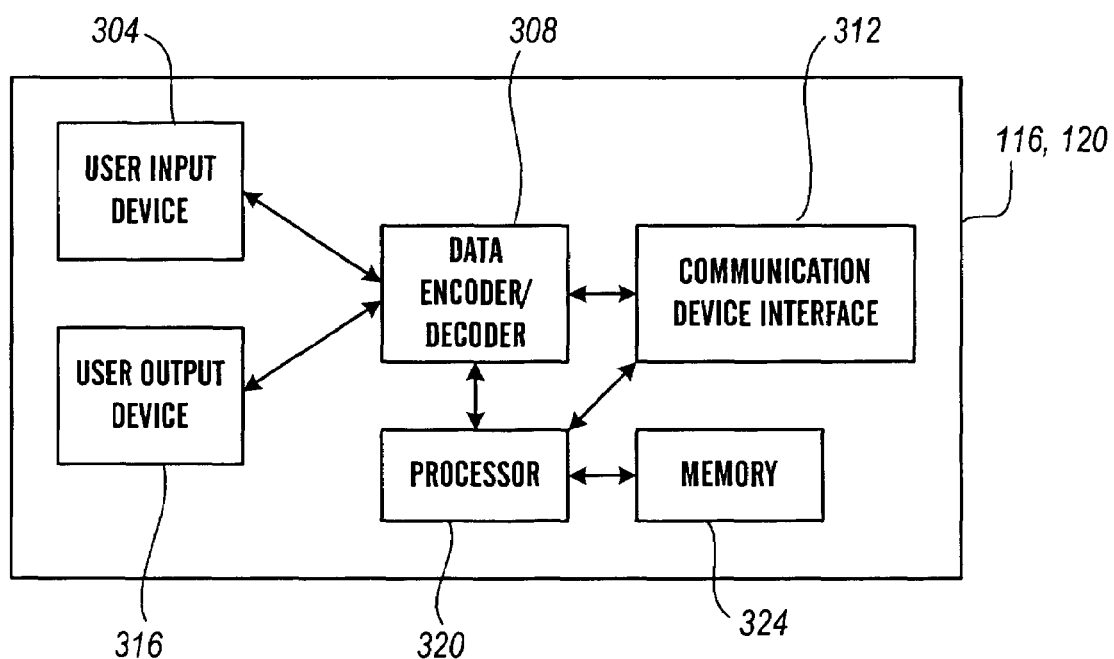
FIG. 3 is a block diagram depicting a TTY device in accordance with an embodiment of the present invention.

With reference now to FIG. 3, a TTY device 116, 120 in accordance with an embodiment of the present invention is illustrated. In general, the TTY device 116, 120 includes a user input device 304. For example, the user input device 304 may comprise a keyboard that allows a user to input characters directly. The user input device 304 transforms the user's selection of a character into an electronic signal that is provided to a data encoder/decoder 308. The data encoder/decoder 308 encodes the selected character as a sequence of audible tones. For example, a TTY device 116, 120 adhering to the standards for such devices in widespread use in the United States in connection with wireline devices interconnected to the public switched telephony network might use Baudot signaling. In Baudot signaling, each character comprises a start bit consisting of an 1800 Hz tone, five tones of either 1400 or 1800 Hz specifying the character, and a 1400

Hz tone as a stop bit. The output from the data encoder/decoder 308 is provided to a communication device interface 312.

The communication device interface 312 generally provides an interface between the TTY device 116, 120 and the associated VoIP communication device 124, 128. Accordingly, the communication device interface 312 may comprise an acoustic coupler. Alternatively, the communication device interface 312 may provide a wireline connection to the VoIP communication device 124, 128. When implemented as a wireline connection, the communication device interface 312 may additionally encode the audible signal information received from the data encoder/decoder 308 as required by the particular VoIP communication device 124, 128. Additionally, it should be appreciated that the communication device interface 312 may provide both an acoustic coupler type interface and an electronic interface.

The TTY device 116, 120 also typically includes a user output device 316. For example, the TTY device 116, 120 may provide a display capable of displaying one or more lines of text to the user. Alternatively or in addition, the user output device 316 may comprise a printer or other device capable of creating a hard copy representation of characters. In general, the user output device 316 receives commands regarding characters to be displayed and/or output from the data encoder/decoder 308. The characters output by the user output device 316 are generally those characters received from another TTY device (e.g., TTY device 120) in communication with the first TTY device (e.g., TTY device 116). In addition, the user output device 316 may output characters entered by the user at that TTY device (e.g., first TTY device 116) in connection with the user input device 304, as confirmation of the user's input.

The TTY device 116, 120 may additionally include a processor 320 and memory 324. The processor 320 is generally capable of controlling and/or implementing the functions associated with the TTY device 116, 120. For example, the processor 320 may implement or control the functions of the data encoder/decoder 308. The memory 324 may generally provide data storage space. In addition or alternatively, the memory 324 may store programs that allow the processor 320 to perform its functions. The processor 320 may comprise, for example, a general purpose programmable processor, ASIC, or DSP. The memory 324 may be any memory suitable for the storage of computer data, including solid state memory such as RAM or ROM. As can further be appreciated, the processor 320 and memory 324 may be implemented as part of a controller.

Figure 4:
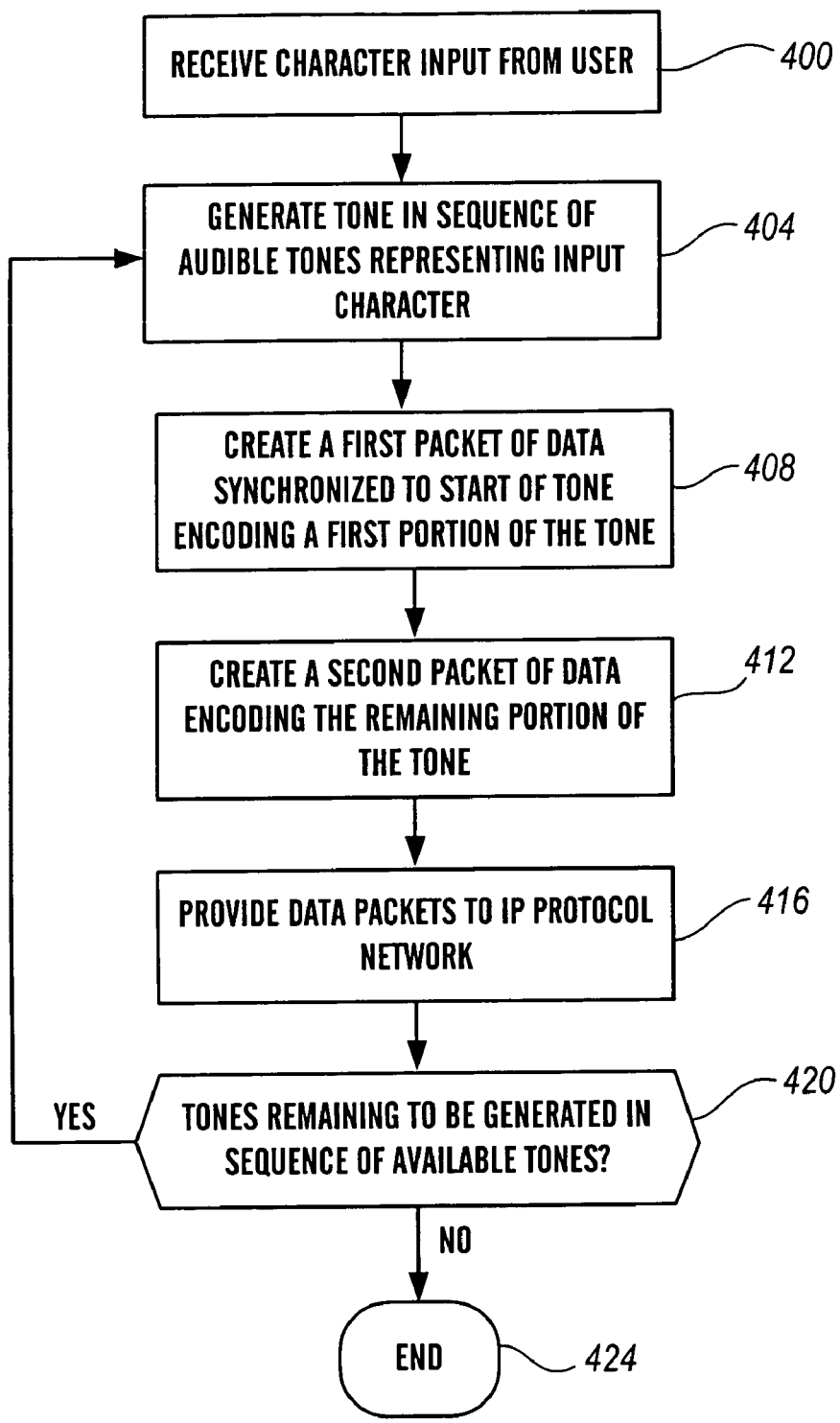
FIG. 4 is a flow chart depicting the transmission of textual characters in accordance with an embodiment of the present invention.

With reference now to FIG. 4, the transmission of a textual character in accordance with an embodiment of the present invention is illustrated. Initially, at step 400, user input comprising the selection of a textual character by the user (e.g., the first user 104) is received. For example, in the present invention, the first user 104 may select the letter "E" by pushing a key provided as part of the user input device 304 of the first TTY device 116. At step 404, a first tone in the sequence of audible tones representing the input character is generated. In the present example, the first tone in the sequence of audible tones representing the selected character "E" is a 22 ms tone having a frequency of 1800 Hz representing the start bit. In general, this tone is generated by the data encoder/decoder 308 and provided to the first VoIP communication device 124 by the communication device interface 312.

The tone is received from the communication device interface 312 by the first VoIP communication device 124, for example by the audible signal receiver 212. At step 408, a first packet of data having a border that is synchronized to the start of the tone and encoding a first portion of the tone is created. In particular, the audible data encoder/decoder 220 receives the tone from the audible signal receiver 212, and passes an electronic representation of the tone to the data packetizer/depacketizer 224. The data packetizer/depacketizer 224 then constructs the first packet of data such that the border of the audible information encoded in that first packet of data is synchronized to the start of the tone. At step 412, a second packet of data encoding the remaining portion of the tone is created. That is, the data packetizer/depacketizer 224 places the remaining portion of the tone in a second packet. To continue the example of the entry of the character "E" according to a TTY device 116 adhering to the standard utilized in the United States, the first 11 ms of the 22 ms, 1800 Hz start bit is encoded in data carried by the first data packet. The remaining 11 ms, 1800 Hz of the start bit is then encoded in the second data packet.

The first and second data packets are then provided to the Internet protocol (IP) network (step 416). Thus, in the present example, the data packets are passed from the data packetizer/depacketizer 224 to the network interface 228 for transmission over the Internet protocol network 112. In a typical implementation, the packets are transmitted serially, with the first packet transmitted first, and the second packet second. As can be appreciated, in an embodiment of the present invention, the first packet of data can be provided to the Internet protocol network 112 as the second data packet is being created.

Next, a determination is made as to whether there are tones within the sequence of audible tones signaling a textual character that remain to be generated (step 420). If tones within a sequence of tones encoding a character remain to be generated, the system, and in particular the VoIP communication device 124, 128, returns to step 404. To continue the previous example, since six tones remain to be encoded and transmitted following the encoding and transmission of the start bit, the system returns to step 404 and the first tone (in the present example, a 1400 Hz tone) in the sequence of five tones denoting the textual character entered by the user is generated and transmitted in steps 404-416. After all of the tones comprising a character have been generated and transmitted, the process for transmitting a character ends (step 424). The process may then be repeated in connection with a next character input by the user.

Figure 5:
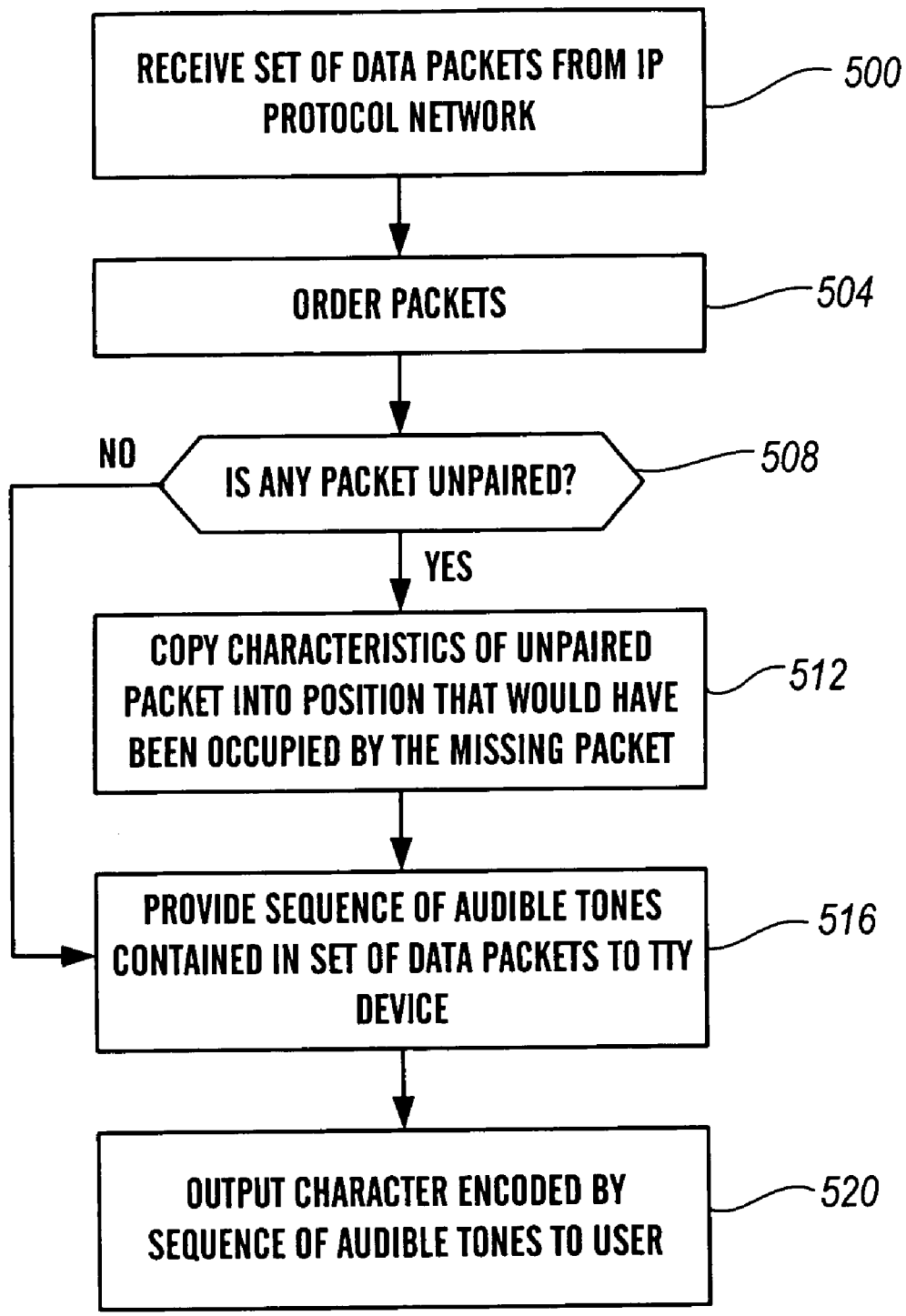
FIG. 5 is a block diagram depicting the receipt of packet data encoding textual characters in accordance with an embodiment of the present invention.

In FIG. 5, the reception of packet data encoding a TTY character is illustrated. Initially, at step 500, a full or partial set of data packets encoding a sequence of tones is received from the Internet protocol network 112. At step 504, the packets are ordered according to the relative position of the data encoded by the packets within the sequence of tones. Because of differential routing, packets of data are often received at the network interface of the receiving VoIP communication device (e.g., second VoIP communication device 128) in an order that does not correspond to the order of the encoded data. Generally, the step of ordering the packets 504 is performed after some interval of time, to allow for varying times of arrival. However, to ensure a natural flow to communications, a limit is placed on the amount of time allowed for packets to arrive before they are considered dropped. For example, about 150 ms may be allowed for a packet to arrive.

At step 508, a determination is made as to whether any of the received packets are unpaired. This determination may be made, for example, by the data packetizer/depacketizer 224 in connection with application programming running on the processor 232. If any packet is found to be unpaired, the characteristics of that packet are copied into the position that would have been occupied by the companion packet (step 512). In particular, according to the present invention, packets containing tones at frequencies utilized by the TTY communication system, for example, 1400 Hz or 1800 Hz in connection with a TTY system in use in the United States, are known to occur in pairs. Furthermore, the data contained in each packet in a pair of tones is essentially identical. Therefore, by copying the characteristics of an unpaired packet into the position within the sequence of packets that would have been occupied by the missing packet (i.e. adjacent to the unpaired packet), the missing data can be reconstructed. Accordingly, a complete sequence of tones, and thus the intended character, can be provided to the recipient, even if some packets of data are dropped. At step 516, the complete sequence of audible tones contained in the set of data packets is provided from the audible data encoder/decoder 220 via the audible signal output 216. As can be appreciated, the audible signal may be provided directly from the audible data encoder/decoder 220 where the communication device interface 312 of the receiving TTY device (e.g., second TTY device 120) comprises an electronic coupler.

If no unpaired data packets are detected at step 508, there are no missing data packets, and the complete sequence of audible tones may be provided to the TTY device (step 516) without a step of reconstructing packets. After receipt of the complete sequence of audible tones from the communication device (e.g., the second VoIP communication device 128), for example, via the audible data encoder/decoder 220 and the audible signal output 216, the TTY device (e.g., the second TTY device 120) may output the character encoded by the sequence of audible tones to the user (step 520). For example, the receiving TTY device (e.g., second TTY device 120) may output the signaled character to the user through the user output device 316.

As can be appreciated from the foregoing description, the present invention provides for the reliable transmission of TTY data over VoIP communication networks.

In particular, the present invention permits TTY characters to be accurately transmitted even when a packet of data comprising a portion of a tone used to encode a character is dropped during transmission of the data across a packet data network. Furthermore, it should be appreciated that the present invention is not limited to use in connection with the TTY standard prevalent in the United States. For example, the present invention may be adapted to the TTY protocol used in the United Kingdom, Ireland, Australia, and South Africa by modifying the system to create packets of data encoding 20 ms of audible data for a complete text character that is about 150 ms in length.

In addition, it should be appreciated that the present invention allows for the convenient transmission of textual data using, for example, Baudot code, and voice data in a single communication session. For example, communications from a first user to a second user may use transmitted text, while communications from the second user to the first may be by voice. Accordingly, transmitted text may be used only to the extent that it is required by the parties to a communication session. Embodiments of the present invention may automatically detect data packets carrying encoded characters by, for example, detecting the length of the encoded audio and/or the frequency of the encoded audio. Accordingly, packets that are unpaired will only be copied when those packets contain encoded characteristics.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for providing signal tones in a voice communication system, comprising:
   receiving a first signal tone having a first length;
   creating a first data packet encoding a first portion of said first signal tone, wherein said first portion of said first signal tone has a second length; and
   creating a second data packet encoding a second portion of said first signal tone, wherein said second portion of said first signal tone has a third length, wherein said second length and said third length are each about equal to one-half said first length.

2. The method of claim 1, wherein said first packet of data encoding said first portion of said first signal tone comprises a digital representation of said audible signal synchronized to a start of said audible tone.

3. The method of claim 1, further comprising:
   providing said first and second data packets to a communication channel.

4. The method of claim 1, wherein said first signal tone is an audible tone, and wherein said step of creating first and second data packets encoding said first and second portions of said first signal tone comprises creating a digital representation of said audible tone.

5. The method of claim 1, wherein said voice communication system comprises a voice over Internet protocol communication system.

6. The method of claim 3, further comprising:
   receiving a voice communication;
   providing said voice communication to said communication system.

7. The method of claim 3, further comprising:
   receiving packets of data encoding a sequence of signal tones, wherein each of said tones is encoded by a first and a second packet of data;
   decoding said received packets of data;
   displaying a textual character corresponding to said sequence of signal tones.

8. The method of claim 3, further comprising:
   receiving packets of data encoding a sequence of signal tones, wherein a first and a second packet of data is expected in connection with each of said signal tones, and wherein only a one of said first and second packets of data is received with respect to at least one signal tone included in said sequence of signal tones;
   generating a missing portion of said at least one signal tone for which only a one of said first and second packets of data is received;
   displaying a textual character corresponding to said sequence of signal tones.

9. The method of claim 8, wherein said step of generating a missing portion of said at least one signal tone for which only a one of said first and second packets of data is received comprises duplicating said data within said received packet of data.

10. The method of claim 8, wherein said step of generating a missing portion of said at least one signal tone for which only a one of said first and second packets of data is received comprises duplicating said received packet.

11. The method of claim 1, wherein said first signal tone is part of a sequence of tones comprising a Baudot character.

12. The method of claim 1, further comprising:
receiving voice data;
creating a plurality of data packets encoding said voice data, wherein each of said data packets encodes a portion of said received voice data having a length about equal to one-half said first length.

13. The method of claim 1, wherein said first length is about 22 ms, wherein said second length is about 11 ms, and wherein said third length is about 11 ms.

14. The method of claim 1, wherein said first length is about 20 ms, wherein said second length is about 10 ms, and wherein said third length is about 10 ms.

15. A method of transmitting textual characters over a packet data voice communication network, comprising:
receiving a first data packet, wherein said first data packet contains data regarding a first portion of a first audible tone;
receiving a second data packet, wherein said second data packet contains data regarding a second portion of said first audible tone;
receiving a third data packet, wherein said third data packet contains data regarding a first portion of a second audible tone; and
generating from said data regarding a first portion of a second audible tone data corresponding to a second portion of said second audible tone.

16. The method of claim 15, wherein said step of generating comprises copying said third data packet.

17. The method of claim 15, wherein said step of generating comprises copying said data regarding a first portion of said second audible tone from said third data packet.

18. The method of claim 15, further comprising:
detecting that said third data packet is unpaired.

19. The method of claim 15, wherein said first data packet is received after at least one of said second data packet and said third data packet, said method further comprising:
reordering said packets, wherein said first packet is positioned before said second data packet and said second data packet is positioned before said third data packet.

20. The method of claim 15, wherein said data regarding a first portion of said second audible tone comprises a first half of said second audible tone, and wherein said generated data regarding a second portion of said second audible tone comprises a second half of said second audible tone.

21. The method of claim 15, wherein said data regarding a first portion of said second audible tone comprises a second half of said second audible tone, and wherein said generated data regarding a second portion of said second audible tone comprises a first half of said second audible tone.

22. A system for transmitting textual characters in connection with a voice over Internet protocol communication system, comprising:
textual data input means;
means for encoding said textual data as a sequence of audible tones;
means for packetizing said encoded textual data, wherein each encoded audible tone within a sequence of audible tones is distributed between at least first and second packets of data such that for each audible tone in said sequence a first half of said audible tone is encoded by said first packet and a second half of said audible tone is encoded by said second packet.

23. The system of claim 22, further comprising:
packet data transmission means, wherein said sequence of audible tones may be transmitted from a first location to a second location.

24. The system of claim 22, further comprising:
means for receiving data packets containing a sequence of audible tones;
means for decoding said sequence of audible tones;
means for displaying textual data.

25. The system of claim 24, further comprising:
means for reconstructing missing data, wherein data encoded by a one of said at least first and second packets encoding an audible tone that is not received by said means for receiving within a predetermined time period is reconstructed from a received one of said at least first and second packets.

26. The system of claim 22, further comprising: means for receiving voice data, wherein said means for packetizing creates packets of data representing received voice data.

27. A device for transmitting textual characters in connection with a voice communication system, comprising:
a tone generator for creating a sequence of audible tones representing a textual character;
an encoder for creating a digital representation of said audible signal;
a packetizer for creating packets of data comprising said digital representation of said audible signal, wherein each audible tone comprising said sequence of audible tones is provided to said communication system as at least two packets of data each containing one-half of said audible tone.

28. The device of claim 27, wherein said tone generator creates tones for representing characters using Baudot signaling.

29. The device of claim 27, wherein a first of said packets of data comprising an individual audible tone comprises a digital representation of said audible signal synchronized to a start of said audible tone.

30. The device of claim 27, further comprising:
a receiver for creating an electrical representation of said audible tones representing a textual character.

31. The device of claim 27, wherein each audible tone comprising a sequence of audible tones is provided to said communication system as a pair of packets, said device further comprising:
a depacketizer, wherein characteristics of a first packet of data of a pair of packets are copied into a second packet of data.

32. The device of claim 27, wherein said packets of data comprise voice over Internet protocol data packets.

* * * * *